United States Patent [19]
Liedloff

[11] Patent Number: 4,727,133
[45] Date of Patent: Feb. 23, 1988

[54] HYDROLYSIS STABLE BLOCK POLYETHERESTERAMIDES AND PROCESS FOR THEIR MANUFACTURE

[75] Inventor: Hanns-Jörg Liedloff, Domat-Ems, Switzerland

[73] Assignee: Inventa AG Fur Forschung und Patentverwertung, Switzerland

[21] Appl. No.: 827,226

[22] Filed: Feb. 5, 1986

Related U.S. Application Data

[63] Continuation of Ser. No. 636,146, Jul. 31, 1984, abandoned.

[30] Foreign Application Priority Data

Aug. 5, 1983 [CH] Switzerland .................. 4254/83

[51] Int. Cl.$^4$ .............. C08G 69/48; C08L 67/00; C08L 77/00
[52] U.S. Cl. ................... 528/288; 525/420; 525/425; 528/279; 528/283; 528/301
[58] Field of Search ........... 528/288, 279, 283, 301; 525/420, 425

[56] References Cited

U.S. PATENT DOCUMENTS

| | | | |
|---|---|---|---|
| 4,208,493 | 6/1980 | Deleens et al. | 525/420 |
| 4,328,331 | 5/1982 | Chen et al. | 528/288 |
| 4,345,052 | 8/1982 | Mumcu et al. | 525/420 |
| 4,345,064 | 8/1982 | Mumcu | 528/288 |
| 4,349,661 | 9/1982 | Mumcu | 528/288 |
| 4,361,680 | 11/1982 | Borg et al. | 525/420 |
| 4,565,849 | 1/1986 | Horikawa et al. | 528/288 |

OTHER PUBLICATIONS

Cols. 1-2, 35-36, U.S. Pat. No. 3,306,875; Hay.

*Primary Examiner*—Harold D. Anderson
*Attorney, Agent, or Firm*—Bierman and Muserlian

[57] ABSTRACT

Hydrolysis-stable, thermoplastic block polyetheresteramides are produced by a catalyzed polycondensation of linear, aliphatic polyamides having carboxyl end groups with $\alpha,\omega$-dihydroxypolyethers and additionally, a linear or branched, aliphatic or cycloaliphatic diol having 2-8 carbon atoms in an amount of 3-30 mol %, relative to the sum of the moles of both other starting materials. The ratio of the moles of the polyamide components to the sum of the moles of the dihydroxypolyether and diol components is 0.81 to 0.985.

8 Claims, No Drawings

HYDROLYSIS STABLE BLOCK POLYETHERESTERAMIDES AND PROCESS FOR THEIR MANUFACTURE

This is a continuation of application Ser. No. 636,146, filed July 31, 1984 and now abandoned.

This application claims priority of Swiss Application No. 4254/83-0, filed Aug. 5, 1983.

Because of their excellent mechanical properties, thermoplastic block polyetheresteramides are superbly suited for the manufacture of injection molded parts, extruded articles of all kinds, fibers and monofilaments. However, the applicability of the block polyetheresteramides is greatly restricted because of their instability to hydrolytic attack, especially as compared with polyamides.

Still, because of the utility of the polyetheresteramides, there have been many attempts to overcome their defects. In the French disclosure document FR-OS No. 2,378,058, for example, the hydrolysis stability of block polyetheresteramides is improved through the partial use of monocarboxylic polyamide blocks. The other chain end of these blocks is terminated by hydrocarbon residues. The number of carboxyl end groups in the block polyetheresteramide is reduced and, since the carboxyl end groups are known to catalyze the hydrolytic disintegration of ester bonds, stability to hydrolysis is improved. Yet the method of FR-OS No. 2,378,058 is disadvantageous because the hydrocarbon residue as a terminal group (e.g., introduced through a monoacid such as stearic acid) restricts the growth of the chain length in the course of the polycondensation reaction. Additionally, the viscosity of the resulting block polyetheresteramides can not be increased through a solid phase after-condensation.

Therefore, in order to obtain polymeric materials of sufficient molecular weight, the monocarboxylic polyamide quantity must be kept small. However, under these conditions, the hydrolysis stability of the block polyetheresteramines is only marginally improved.

It is an object of the invention to provide a hydrolysis stable polyetheresteramide and a process for forming the same.

The process according to the invention for the manufacture of hydrolysis stable block polyetheresteramides without the disadvantages described above comprises catalytic condensation of (a) a linear, aliphatic polyamide having a molecular weight of from about 700 to about 15,000 having carboxyl end groups, (b) an α,ω-dihydroxypolyether having a molecular weight of from about 400 to about 4,000, and (c) a linear or branched, aliphatic and/or cycloaliphatic diol having 2–8 carbon atoms, the diol being present in an amount of 3–30 mol %, relative to the sum of the moles of components (a) and (b)

in the presence of an esterification catalyst. The reaction pressure ranges from a high vacuum to atmospheric pressure, and the reaction temperature is from about 210° to about 280° C. Additionally the following relation must be obeyed in the finished block polyetheresteramide.

$$0.81 \leq \frac{M_a}{M_b + M_c} \leq 0.985$$

wherein $M_a$, $M_b$, and $M_c$ are the number of moles of components a, b, and c, respectively. The diol (c) is used in a 1.5 to 10-fold excess of the above amounts, and this excess is recovered by being distilled off from the reaction mixture during the polycondensation.

Preferred known linear aliphatic polyamides having carboxyl end groups are those which are obtained from the reaction of the monomers of Polyamide 6, Polyamide 11, Polyamide 12, Polyamide 6.6, Polyamide 6.9, Polyamide 6.10, Polyamide 6.12, Polyamide 6.13, or from mixtures thereof and (a) linear or branched aliphatic, dicarboxylic acids having 4–13 carbon atoms, or (b) aromatic or cycloaliphatic dicarboxylic acids having at least 8 carbon atoms.

The α,ω-dihydroxypolyethers of component (b) are preferably polyetherdiols or copolyetherdiols having a molecular weight of from about 500 to about 3,000, and whose oxygen atoms are separated from one another by at least 2 carbon atoms of a branched chain or by a linear chain having 2–4 carbon atoms.

The polycondensation reaction of the invention is carried out in the presence of an esterification catalyst. Preferably, titanium catalysts, such as tetraalkyltitanates, e.g., tetrabutyltitanate; zirconium catalysts, such as zirconium tetrabutylate or zirconium tetraisopropylate; hafnium catalysts, such as hafnium tetraalkoxides; stannic catalysts, such as dibutyl tin oxide hydroxide or dibutyl tin dilaurate; stannous catalysts, such as stannous oxide, tin chloride; stannous salts of organic acids, e.g. tin dibenzoate, tin distearate, tin oxalate, or the stannous salt of a polyamide having carboxyl end groups.

The quantity of the catalyst used, relative to the total weight of the other components, is about 0.01 to about 1% by weight, preferably about 0.3 to about 0.5% by weight. When the catalyst is the stannous salts of a polyamide having carboxyl end groups, only the tin portion of the molecule is counted as catalyst.

An important role in the selection of the catalyst is played by its solubility in the polyamide and/or polymer melt. The stannous salts are very soluble in the polyamides or their melts. However, tetraalkyltitanates and zirconates, as well as butyl tin oxide hydroxide, leave solid residues in the polymers. The manufacture of the block polyetheresteramides of the invention is particularly simple when stannous salts of polyamides having carboxyl end groups are used as the catalysts.

These stannous-polyamide salts are manufactured by adding simple inorganic stannous compounds, e.g., SnO, SnCO$_3$, to the melt of the polyamides having carboxyl end groups prior to the addition of the other components; i.e. the polyether and the diol.

The manufacture of the known polyamides having the carboxyl end groups is accomplished by known methods which vary with the particular polyamide. These polyamides may have from 2 up to about 130 monomer units. In obtaining the known polyamides having carboxyl end groups, one may also break down with a longer-chained polyamide, under suitable conditions, with dicarboxylic acid into shorter, carboxyl end group polyamide chains.

Normally, the polyamides are produced by polycondensation of the appropriate monomers and dicarboxylic acids at atmospheric pressure or—in the case of caprolactam and laurinlactam—by hydrolytic polymerization in the presence of a dicarboxylic acid at temperatures of 200°–320° C. and at pressures of 2–30 bar.

After a degasification phase, the condensation water and/or the additionally added quantity of water is removed from the polyamide melt. If appropriate, the temperature is reduced and the other components necessary for the manufacture of the block polyetheresteramides of the invention are added. Subsequent thereto, the polycondensation is carried out. The diols can be added after the polyethers are incorporated into the reaction vessel, or a portion can be added at the same time as the polyether and the rest of the diol may follow later.

The formation of the block polyetheresteramides often starts at atmospheric pressure and is brought to completion through the gradual reduction of the pressure to about 0.1 mbar. The polycondensation temperature is 210°–280° C., preferable 230°–270° C.

The block polyetheresteramides produced according to the process of this invention exhibit a greater stability to hydrolytic attack than comparable products produced according to known processes. Even relatively soft block polyetheresteramides having polyether components of more than 40% by weight, and a correspondingly high number of hydrolysis-sensitive ester groups in the polymer chain, can be effectively protected from hydrolysis with the present process. Their hydrolysis rates under more severe conditions—boiling water—are only half as great and, therefore, their lifetimes are thus about twice as long, as those of comparable state of the art products. It is intended that "comparable product" means known state of the art block polyetheresteramides suitable for injection molding and extrusion processing, lacking short-chained diol-components. In addition to the aforementioned French FR-OS No. 2,378,058, processes starting with polyamides having carboxyl end groups and polyether diols are described in the DOS-OS No. 2,523,991, DOS No. 2,837,687 and in German Pat. No. 2,932,334.

The block polyetheresteramides according to the invention can also contain, the usual additives, such as antioxidants, light and heat stabilizers, flame retardants, dyes and plasticizers. These additives can also be added before or during polycondensation provided they do not interfere with the reaction.

The following examples illustrate, but do not limit the invention.

The solution viscosities were measured according to DIN 53 727 with 0.5% solutions of the block polyetheresteramides in m-cresol at 25° C. To evalute the hydrolysis stability of the block polyetheresteramides in the Comparative Examples and Examples the decrease in solution viscosity (as a measurement of molecular weight) was determined during storage in boiling water at 100° C.

EXAMPLE 1

278.0 g of polyamide 12 having carboxyl end groups, with a mean molecular weight of 923, is obtained from (a) laurinlactam or ω-aminolauric acid and (b) dodecanedioic acid according to known polymerization or polycondensation processes. This polyamide 12 is mixed with 0.22 g of stannous oxide, and placed in a 1-liter autoclave at 250° C. under an inert gas atmosphere ($N_2$) with constant agitation. 294.8 g of polytetrahydrofuran, having a mean molecular weight of 990, and 40 g of butane-1,4-diol are added as soon as the SnO catalyst dissolves in the polyamide melt. The dissolution is determined by the disappearance of the black SnO particles; it takes about 3 minutes. The resulting mixture is initially stirred for 20 minutes at 250° C. under an inert gas, whereby a portion of the excess butane-1,4-diol and the reaction water is distilled off.

Subsequently, the pressure in the reactor is reduced and polycondensation is continued at 250° C. under a pressure of 15 Torr with agitation for 1 hour. Nearly all of the reaction water and the excess butane-1,4-diol is removed from the polymer melt during this time. The polycondensation is finally brought to completion by further reducing the pressure to 0.5 Torr within 60 minutes, at 250°.

The product obtained is then removed as a strand and granulated. Its relative viscosity is 1.764. The determination of the carboxyl end group yields a value of 5 meq/kg (milliequivalents per kilogram), while the hydroxy end group determination is 66 meq/kg. From the mole count of the carboxyl end group polyamide 12, the polytetrahydrofurandiol, and the results of the end-group-determination, $$\frac{M_a}{M_b + M_c} = 0.89$$

When the granulate is stored in boiling water, this product shows the following decrease in its viscosity over time:

| Time (h) | $\eta_{rel}$ (0.5% m-cresol) |
|---|---|
| 0 | 1.764 |
| 6 | 1.752 |
| 24 | 1.708 |
| 72 | 1.635 |
| 168 | 1.493 |

COMPARISON EXAMPLE 1

278.8 g of the polyamide 12 of Example 1 is polycondensed with 297.8 g of polytetrahydrofuran, having an average molecular weight of 990, in the presence of 0.22 g of stannous oxide as a catalyst. With the exception of the polycondensation phase at high vacuum (0.5 Torr), the reaction conditions of Example 1 were followed. The polycondensation time at 0.5 Torr is 40 minutes. The product has a relative viscosity of 1.78.

COOH end groups: 36 meq/kg
OH end groups: 32 meq/kg

Upon hydrolytic damaging in boiling water, this product shows a faster decrease of the relative viscosity than the polymer of Example 1:

| Time (h) | $\eta_{rel}$ 0.5% m-cresol |
|---|---|
| 0 | 1.78 |
| 7 | 1.675 |
| 24 | 1 611 |
| 72 | 1.527 |
| 168 | 1.331 |

EXAMPLES 2–4/COMPARISON EXAMPLES 2–4

Examples 2–4 differ from Example 1 only in the esterification catalyst used and the polycondensation time at high vacuum, i.e. at 0.5 Torr. Comparison Examples 2–4 differ similarly from Comparison Example 1. The following esterification catalysts were used:

A: Stannous benzoate; $Sn(OOC-C_6H_5)_2$

B: Titanium tetrabutylate; Ti(OC$_4$H$_9$)$_4$
C: Zirconium tetrapropylate; Zr(OC$_3$H$_7$)$_4$ The results of these examples and comparison examples are shown in the following table. In this table, the various catalysts are indicated by the corresponding letters.

| Block polyether-esteramide | Components[1] (g) | Catalyst Type | Catalyst Quantity (g) | Polycondensation conditions at high vacuum[2] T (°C.) | P (Torr) | Time (Min.) | Analyses $\eta_{rel}$ (0.5% m-cresol) | End group[4] (meq/Kg) COOH | OH | $\dfrac{M_a}{M_b + M_c}$ | Hydrolysis in boiling water $\eta_{rel}$ (0.5% m-cresol) after 6 h. | 24 h. | 72 h. | 168 h. |
|---|---|---|---|---|---|---|---|---|---|---|---|---|---|---|
| Example 2 | as in Example 1 | A | 0.6 | 250 | 0.5 | 120 | 1.682 | 3 | 92 | 0.86 | 1.715 | 1.705 | 1.664 | 1.516 |
| Comp. Example 2 | as in Comp. Ex. 1 | A | 0.6 | 250 | 0.5 | 30 | 1.739 | 47 | 38 | — | 1.641 | 1.562 | 1.460 | 1.315 |
| Example 3 | as in Example 1 | B[3] | 0.6 | 250 | 0.5 | 230 | 1.690 | 3 | 90 | 0.87 | 1.690 | 1.667 | 1.638 | 1.574 |
| Comp. Example 3 | as in Comp. Ex. 1 | B[3] | 0.6 | 250 | 0.5 | 240 | 1.711 | 45 | 53 | — | 1.741 | 1.705 | 1.575 | 1.363 |
| Example 4 | as in Example 1 | C[3] | 0.6 | 250 | 0.5 | 200 | 1.716 | 7 | 83 | 0.88 | 1.693 | 1.658 | 1.633 | 1.485 |
| Comp. Example 4 | as in Comp. Ex. 1 | C[3] | 0.6 | 250 | 0.3 | 30 | 1.749 | 41 | 44 | — | 1.662 | 1.570 | 1.452 | 1.328 |

[1]refers to Co-components
(a) Polyamide having carboxyl end groups
(b) α,ω-dihydroxypolyether and
(c) diol
[2]Otherwise, the procedure was as in Example 1 or Comparison Example 1, respectively.
[3]The catalyst was added to the mixture of (a), (b), and (c); or (a) and (b); respectively.
[4]The NH$_2$-end group concentration is in all instances too small to be affected by titration.

The block polyetheresteramides produced according to the invention exhibit higher hydrolysis stability than comparable products manufactured according to state of the art processes. In particular, relatively soft block polyetheresteramides with a polyether content of more than 40% by weight and a correspondingly high number of hydrolysis-sensitive ester groups in the polymer chain can also be effectively protected against hydrolytic disintegration. Their hydrolysis rates under the strenuous condition of boiling water (see the examples) is only about half as great and, consequently, their lifetimes are about twice as long, as those of comparable prior art products.

We claim:

1. A process for the manufacture of hydrolysis-stable thermoplastic block polyetheresteramide comprising polycondensing
   (a) at least one linear, aliphatic polyamide having carboxyl end groups and a molecular weight of from 700 to 15,000,
   (b) at least one α,ω-dihydroxypolyether having a molecular weight of from 400 to 4,000 and
   (c) at least one diol selected from linear or branched, aliphatic or cycloaliphatic diols having 2-8 carbon atoms which diol is present in an amount of 3-30 mole %, relative to the total of said components (a) and (b), in the presence of an esterification catalyst at a pressure ranging from high vacuum to atmospheric pressure at temperatures of 210°–280° C., and $$0.81 \leq \frac{M_a}{M_b + M_c} \leq 0.985$$

wherein $M_a$, $M_b$ and $M_c$ are the number of moles of said components (a), (b), and (c) in said polyetheresteramide, respectively.

2. The process of claim 1, wherein said diols are present initially in an amount which is a 1.5 to 10-fold excess over the amount defined in claim 1, said excess being recovered during the polycondensation.

3. The process of claim 1 wherein said polyamides are obtained from the reaction of the monomers of polyamide-6, polyamide-11, polyamide-12, polyamide-6.6, polyamide-6.9, polyamide-6.10, polyamide-6.12, polyamide-6.13, or mixtures thereof with an acid selected from the class consisting of (a) linear or branched, aliphatic dicarboxylic acids having 4 to 13 carbon atoms, and (b) aromatic or cycloaliphatic dicarboxylic acids having at least 8 carbon atoms.

4. The process of claim 1 wherein said α,ω-dihydroxypolyether is selected from polyetherdiols or copolyetherdiols having a molecular weight of from 500 to 3,000, having oxygen atoms which are separated from one another by at least 2 carbon atoms of a branched chain or by a linear chain having 2–4 carbon atoms.

5. The process of claim 1 wherein said catalyst is selected from titanium, zirconium, hafnium, or tin compounds.

6. The process of claim 1 wherein said catalyst is present in an amount of 0.01–1% by weight relative to the sum of components (a), (b), and (c).

7. A block polyetheresteramide resulting from the process of claim 1.

8. A block polyetheresteramide comprising the reaction product of
   (a) linear, aliphatic polyamide having carboxyl end groups and a molecular weight of from 700 to 15,000 in a molar amount $M_a$,
   (b) α,ω-dihydroxypolyethers having a molecular weight from 400 to 4,000 in a molar amount $M_b$, and
   (c) diols selected from linear or branched, aliphatic and cycloaliphatic diols having 2-8 carbon atoms in a molar amount $M_c$, wherein $M_c$ is 3-30% of $M_a+M_b$ and $$0.81 \leq \frac{M_a}{M_b + M_c} \leq 0.985$$

* * * * *